United States Patent [19]

Seo

[11] Patent Number: 5,481,416

[45] Date of Patent: Jan. 2, 1996

[54] SEARCH METHOD AND CIRCUIT UTILIZING AN AUDIO SIGNAL

[75] Inventor: Byong-Lyul Seo, Seoul, Rep. of Korea

[73] Assignee: Samsung Electronics Co., Ltd., Kyungki-do, Rep. of Korea

[21] Appl. No.: 324,530

[22] Filed: Oct. 18, 1994

Related U.S. Application Data

[63] Continuation of Ser. No. 942,229, Sep. 9, 1992, abandoned.

[30] Foreign Application Priority Data

Sep. 9, 1991 [KR] Rep. of Korea .................. 91-15880

[51] Int. Cl.$^6$ ..................................... G11B 15/18
[52] U.S. Cl. ................... 360/72.2; 360/69; 360/75; 369/53
[58] Field of Search ......................... 369/53, 54, 50, 369/58, 124, 32, 48; 360/72.2, 72.1, 73.11, 69, 75, 14.3, 18, 19.1

[56] References Cited

U.S. PATENT DOCUMENTS

| | | | |
|---|---|---|---|
| 4,224,644 | 9/1980 | Lewis et al. | 360/72.2 |
| 4,799,111 | 1/1989 | Ito | 360/14.3 |
| 5,038,231 | 8/1991 | Herigaya et al. | 360/69 |
| 5,105,401 | 4/1992 | Aoyagi et al. | 360/72.2 |

*Primary Examiner*—Georgia Y. Epps
*Assistant Examiner*—Muhammad N. Edun
*Attorney, Agent, or Firm*—Sughrue, Mion, Zinn, Macpeak & Seas

[57] ABSTRACT

The present invention relates to a search method and circuit for searching specific portion of a tape, and more particularly to a search method and circuit by utilizing audio signal, wherein specific audio signal having frequency above the audio frequency is recorded on the audio track within the tape of video processing system and sound instrument and the desired position can be quickly searched by the detection of said specific audio signal during selection of search mode, thus resulting in simple circuit construction and prevention of wrong operation possibly caused by recordless portion between tunes.

13 Claims, 2 Drawing Sheets

SEARCH METHOD AND CIRCUIT UTILIZING AN AUDIO SIGNAL

This is a continuation of application Ser. No. 07/942,229, filed Sep. 9, 1992, now abandoned.

BACKGROUND OF THE INVENTION

1. Field of the Invention

The present invention relates to a search method and circuit therefor, which can search a certain predetermined part of a tape, and more particularly to a search method and circuit utilizing an audio signal, which can record on the audio track specific audio signals having a frequency above the audio frequency yet within the audio range of image processing systems and sound instruments such as VCRs, camcorders (Movie Camera) and the like, and can ascertain a desired position quickly by detecting the specific audio signal upon selection of a search mode by an operator.

2. Description of the Prior Art

Generally, the search method applied by conventional image processing systems utilizes a duty ratio of control pulses that are recorded in a tape control track and that are recorded differently from normal information signals. Thus, conventional processing systems would search for a tape location recorded with a different duty ratio of control pulses during the execution of a search operation. A conventional search method applied to prior art sound instruments detected an unrecorded portion between recorded selections.

However, the conventional method of ascertaining the desired tape location by recording different duty ratios of control pulses is impractical in that it requires a complicated circuit construction. Specifically, a circuit that detects control pulses must be constructed for finding a location having a different duty ratio. Also a circuit must be provided which causes changes in duty ratio of control pulses. In the case of sound instruments, the method of finding the desired location by utilizing unrecorded portions between recordings has a drawback in that only the first part or end part of a song can be searched and the middle of a song cannot be searched. In addition, if there is a long period of recess in the middle of a song, this portion can be mis-read as an unrecorded portion, in which case incorrect operation results.

SUMMARY OF THE INVENTION

Accordingly, it is the object of the present invention to provide a search method and circuit capable of searching a specific audio signal after recording the specific audio signal in the audio track of a tape, whereby the specific audio signal has frequencies above the audio frequency, such that a circuit simple in construction results. It is a further object of the invention to provide a search method and circuit that enables a user to find a selected part of a tape when a search instruction is applied to a sound instrument and that prevents incorrect operation caused by unrecorded areas in and between songs or selections.

The present invention relates to a search method and circuit for an image processing system, sound instrument or the like, the search method of which comprises the steps of:

generating a search signal in accordance with an input of a search key entered during recording;

recording the search signal generated and an audio signal on the recording medium; and detecting the search signal during high speed playback in accordance with a search key instruction input during playback, and the search circuit of which, comprises:

a control means for controlling the generation of a search mode enable signal and set operation;

an audio signal generator for recording and reproducing a search signal on an audio track of a recording medium and for generating the search signal according to the search mode enable signal outputted from the control means; and a search signal detecting means for detecting the search signal outputted from said audio signal generator.

Thus, the search signal constitutes a flag which pinpoints the location on the recording medium of the recorded information desired to be reproduced.

BRIEF DESCRIPTION OF THE DRAWINGS

For a more complete understanding of the nature and objects of the present invention, reference should be made to the following detailed description taken in connection with the accompanying drawings in which.

DETAILED DESCRIPTION OF THE INVENTION

Figure 1:
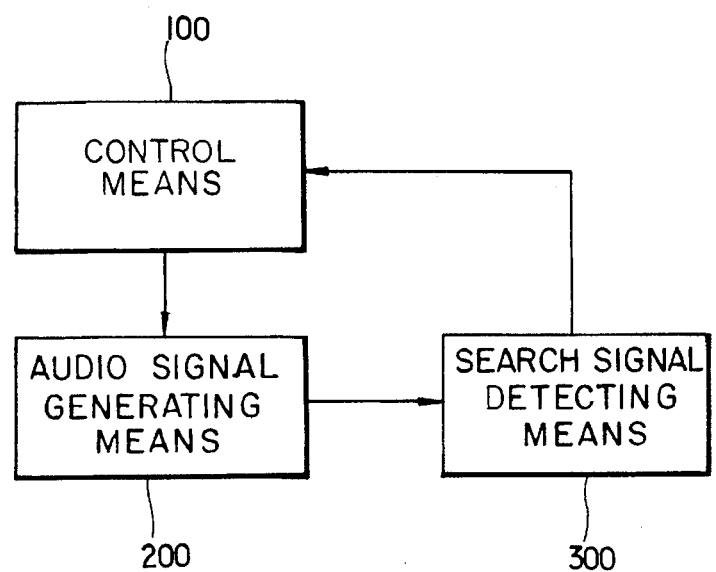
FIG. 1 is a block diagram for showing the overall construction of a search circuit utilizing an audio signal in accordance with the present invention.

FIG. 1 is a block diagram of a search circuit utilizing an audio signal in accordance with the present invention, wherein there are provided a control means 100 for controlling the generation of a search mode enable signal and set operation, and an audio signal generating means 200 for recording and reproducing the search signal on the audio track of a recording medium. The audio signal generating means 200 generates a search signal which constitutes a flag by way of the search mode enable signal outputted from the control means 100. It also generates the recording and reproducing of the audio signal.

In FIG. 1, there is also provided a search signal detecting means 300 for outputting a detection signal to the control means 100 upon detection of the search signal in the audio signal outputted from the audio signal generating means 200.

Accordingly, when the user presses various keys for set operation, the control means 100 in FIG. 1 perceives the key signal generated by the key operation and controls the appropriate part of the set.

If the user presses a search key to implement the search function, the control means 100 generates a search mode enable signal.

The audio signal generating means 200 records the normally inputted audio signal onto a recording medium. It also outputs the audio signal by amplification after reading the audio signal recorded on the recording medium.

If a search mode enable signal is inputted from the control means 100, the audio signal generating means 200 generates a search signal having frequencies above the audio range in frequency. This signal is recorded on the recording medium by the generating means 200 and is output by the generating means as well after the generating means reads a search signal recorded on the recording medium.

The search signal detecting means 300 detects the search signal from the audio signal generated from the audio signal generating means 200 and outputs an appropriate signal to the control means 100, which controls the set or perceives the tape status (tape position and the like) following the input of the detection signal put out by the search signal detecting means 300.

Figure 2:
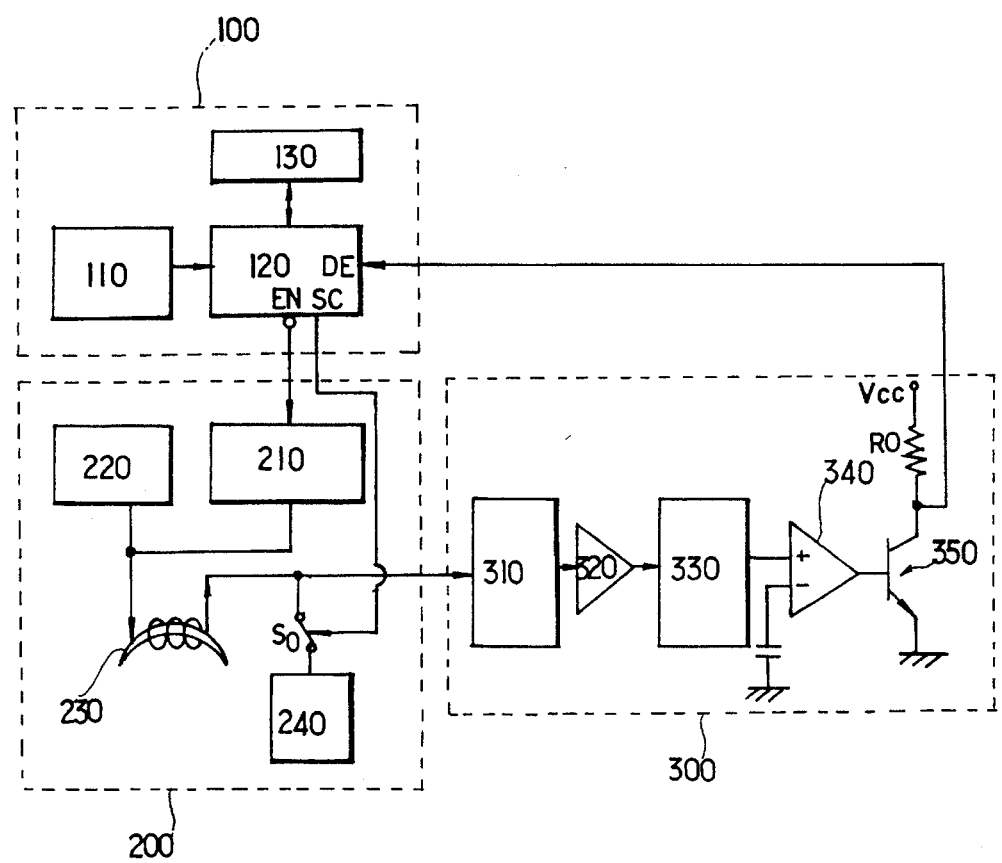
FIG. 2 is a block diagram for illustrating in detail the construction of a search circuit utilizing an audio signal in accordance with the present invention.

FIG. 2 is a detailed block diagram for illustrating in detail the construction of the search circuit utilizing an audio signal in accordance with the present invention. As shown in FIG. 2, the control means 100 comprises:

a search switch 110 for selecting a search mode; and a microprocessor 120 for generating the search mode enable signal and for controlling a mechanism part 130 of the set by reading the signals generated by the operation of the search switch 110 and various keys (not shown).

The audio signal generating means 200 comprises:

an oscillator 210 for generating a search signal having frequencies above audio frequency in response to a search mode enable signal generated by the microprocessor 120 of the control means 100;

a head 230 for recording onto a recording medium the audio signal inputted through the audio input means 220 and the search signal generated by the oscillator 210 and for reproducing the signal recorded on the recording medium;

a first amplifier 240 for outputting to external output means (speaker or terminal) an amplified audio signal reproduced from the head 230; and a switch $S_0$ for interrupting the audio signal outputted to the first amplifier 240 in accordance with a switch control signal from the microprocessor 120.

The search signal detecting means 300 comprises:

a bandpass filter 310 for passing the frequency bands having frequencies above the audio frequency from the audio signal reproduced by the head 230 of the audio signal generating means 200;

a second amplifier 320 for amplifying the output of the bandpass filter 310;

a smoothing circuit 330 for converting the output of the second amplifier 320 to direct current;

a comparator 340 for comparing the direct current of the smoothing circuit 330 with a reference voltage $V_{ref}$; and a transistor 350 for outputting a detection signal according to the output of the comparator 340 and for supplying the detection signal to the microprocessor 120 of the control means 100.

Accordingly, in FIG. 2, the microprocessor 120 in the control means 100, based on the operation of various keys (not shown), drives the set by controlling a mechanism part 130.

If the user intends to locate a specific position of a tape again, the user presses the search switch 110 at the position the user intends to find again.

When the search switch 110 is pressed, the microprocessor 120 perceives the switching signal generated from the operation of search switch 110 and generates a search mode enable signal.

The search mode enable signal generated by the microprocessor 120 of the control means 100 is supplied to the oscillator 210 of the audio signal generating means 200, and, once this signal is supplied to the oscillator 210, the oscillator 210 outputs a search signal having frequencies above the audio frequency, which can be converted freely by the user and which functions as a flag.

The search signal generated by the oscillator 210 is applied to the head 230, which records on the recording medium the search signal having frequencies above the audio frequency generated by the oscillator 210.

In this location, the head 230 conventionally records on the recording medium various audio signals inputted into the audio input means 220, and reproduces the audio signals recorded on the recording medium.

As a result, during a reproduction operation initiated by the key operation of the user, the search signal which functions as a flag and which was generated at the oscillator 210 and recorded on the recording medium by the head 230, and the audio signal which was input into the audio input means 220 and recorded on the recording medium by the head 230 are reproduced by the head 230.

The reproduced audio signal is converted to an aural output signal through the first amplifier 240 and, at the same time, is supplied to the bandpass filter 310 of the search signal detecting means 300.

The search signal reproduced from the head 230 and having the frequencies above the audio frequency does not affect the aural signal outputted from the first amplifier 240.

The bandpass filter 310 of the search signal detecting means 300 passes the search signal having the frequencies above the audio frequency from the audio signal, and the search signal filtered through the bandpass filter 310 is amplified at the second amplifier 320, and then is converted to a direct current in the smoothing circuit 330.

At this point, as the frequency filtered through the bandpass filter 310 is set up above the audio frequency, only that portion of the audio signal above the audio frequency passes to the output side of the bandpass filter 310. In the case where only the normal audio signal is reproduced by the head 230, no signal passes to the output side of the bandpass filter 300.

Accordingly, only when the search signal having frequencies above the audio frequency is reproduced by the head 230 is the search signal passed to the output side of bandpass filter 310. If a signal is present at the output, however, it is amplified at the second amplifier 320 and is converted to direct current by the smoothing circuit 330 so that it may be compared at the comparator 340 with the reference voltage $V_{ref}$.

The comparator 340 drives the transistor 350 whenever a search signal is reproduced. A signal of a given logic level (low level signal, for example) is then generated by the transistor 350 for supplying a detection signal to the microprocessor 120 of the control means 100.

The microprocessor 120 then performs the function initiated by the user's key operation after the detection signal is supplied to the microprocessor 120.

For example, when the user presses a high speed search key, the microprocessor 120 outputs a switch control signal Sc for opening the switch $S_0$ and for cutting off the audio output to the first amplifier 240. At the same time, the microprocessor 120 controls the mechanism part 130 to perform a winding or re-winding operation of the tape at a high speed. When the search signal is detected by the search signal detecting means 300, the microprocessor 120 controls the mechanism part 130 such that the tape stops running and a reproduction operation is performed.

Figure 3:
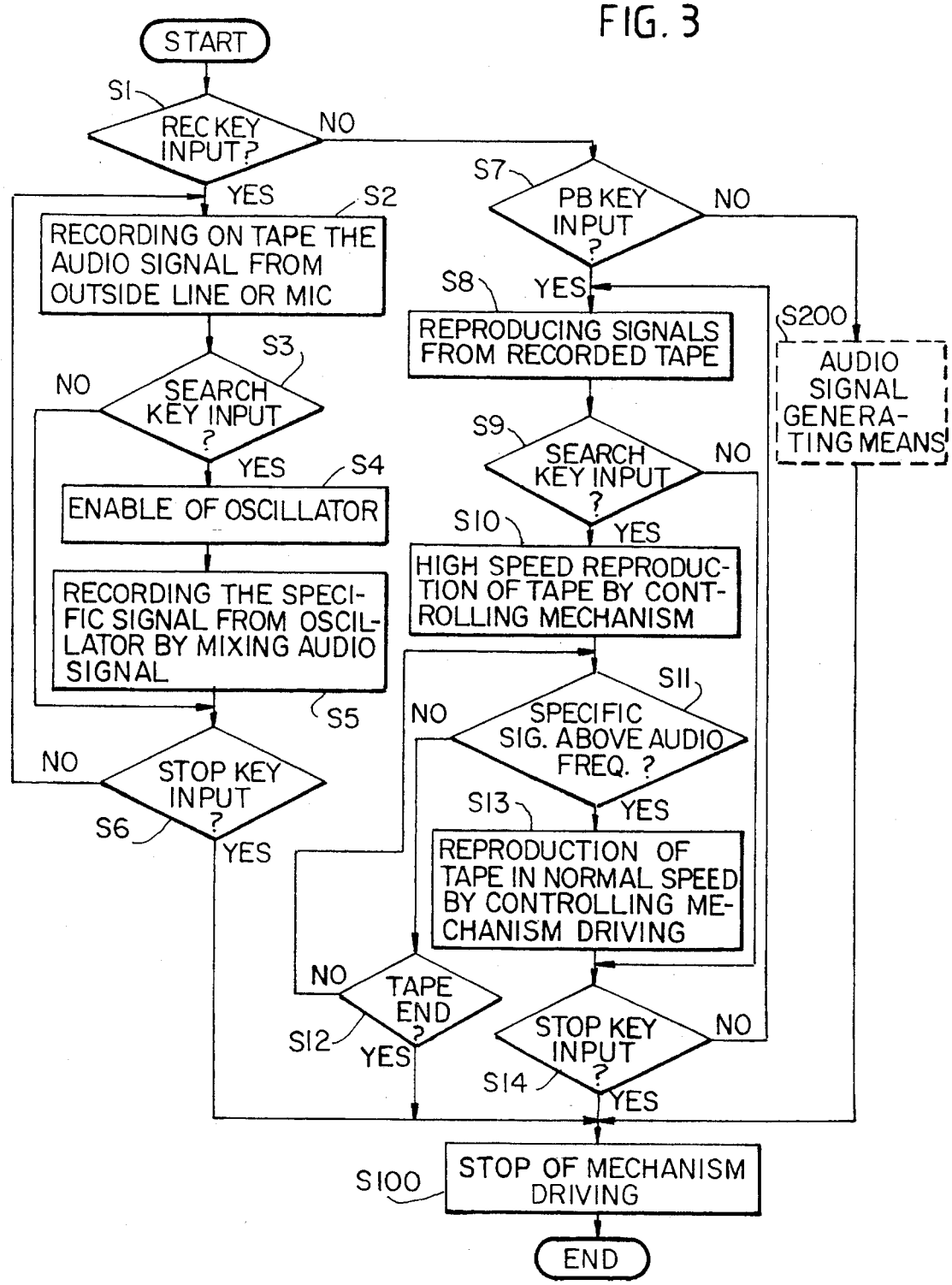
FIG. 3 is a flow chart of a search method utilizing an audio signal in accordance with the present invention.

FIG. 3 is a flow chart of a search method utilizing an audio signal in accordance with the present invention, comprising the steps of:

generating a search signal;

recording the search signal along with an audio signal onto a recording medium; and detecting the search signal during high speed playback in accordance with a search key instruction input during playback.

In FIG. 3, when a tele-recording or recording key is activated at step S1, a video or audio signal supplied from an external source is recorded on the tape at step S2.

When a video signal or audio signal is recorded on the tape and, simultaneously, a key signal is inputted at step S3 by the operation of a search key, the oscillator is enabled at step S4 for generating a search signal having frequencies above the audio frequency, which search signal functions as a flag. The generated search signal and the audio signal inputted from the external source are recorded on the audio track of the tape at step S5.

Thereafter, the system checks for an input of a stop key signal at step S6. If there is no input of a stop key signal, tele-recording or recording continues. If, on the other hand, a stop key signal is input, the operation of the mechanism part is stopped at step S100.

Turning now to the playback process, when a playback key signal is input at step S7 by activating a reproduction key, the video signal or audio signal recorded on the tape is reproduced at step S8.

During the playback of the video signal or audio signal, a search signal can be entered (step S9) by operating a search key. As a result, the audio signal is muted and, simultaneously, the mechanism part is controlled for high speed playback as shown in step S10.

After high speed playback is initiated, the system discriminates for the search signal having frequencies above the audio frequency (step S11). If the search signal is not detected, the search for the search signal continues until the end of tape is discriminated at step S12, at which point the driving mechanism is stopped.

If the specific search signal is detected, the driving mechanism is controlled so that a playback operation is performed at step S13 with the tape at normal speed.

During playback, if a key signal is entered due to activation of a stop key, the operation of the mechanism part is ended at step S100.

Of course, if neither a tele-recording key input, nor a recording key input, nor a playback key input is entered, the process branches to step S200.

In this manner, the search method and circuit utilizing an audio signal in accordance with the present invention provides a simple circuit construction for detecting specific audio signals recorded on an audio track, can search for a desired tape position quickly, and can prevent defective operation possibly caused by unrecorded portions between recorded selections.

What is claimed is:

1. A search method for finding a desired location on a recording medium, comprising the steps of:

generating a flag in accordance with an input of a search command by a user for marking the desired location;

recording the flag on an audio track of the recording medium at substantially the desired location; and detecting the flag during a high speed playback of the medium in accordance with a further search command entered during playback.

2. A search method as defined in claim 1, wherein the recording step includes:

recording an external information signal;

enabling an oscillator to generate a search signal having frequencies outside a frequency range of an audio signal portion of the external information signal; and recording on the audio track of the recording medium the generated search signal and the audio signal portion, such that the search signal is intermixed with the audio signal portion.

3. A search method as defined in claim 2, wherein the search signal has frequencies above the frequency range of the audio signal portion of the external information signal.

4. A search method as defined in claim 1, wherein the detecting step includes:

reproducing an audio signal portion of an external information signal recorded on the recording medium in accordance with a playback key signal;

detecting the flag during the high speed playback of the medium in accordance with the further search command;

changing playback speed of the medium to a normal speed when the flag is detected; and stopping playback of the medium if an end of the medium is detected prior to detection of the flag.

5. A search circuit for finding a desired location on a recording medium, comprising:

a control means for controlling the generation of a search mode enable signal for marking the desired location;

audio signal generating means for generating a search signal according to the search mode enable signal outputted from said control means and for recording and reproducing the search signal on an audio track of a recording medium at substantially the desired location; and a search signal detecting means for detecting the search signal outputted from said audio signal generating means, wherein said search signal detecting means comprises:

a bandpass filter for passing frequency bands having frequencies above frequencies of an audio signal reproduced by a head of said audio signal generating means;

an amplifier for amplifying an output of said bandpass filter;

a smoothing circuit for converting an output of said second amplifier to direct current;

a comparator for comparing the direct current of said smoothing circuit with a reference voltage; and a transistor for generating a detection signal in accordance with an output of said comparator.

6. A search circuit as defined in claim 5, wherein said control means comprises:

a search switch for selecting a search mode; and a microprocessor for generating the search mode enable signal in accordance with the operation of said search switch.

7. A search circuit as defined in claim 5, wherein said audio signal generating means comprises:

an oscillator for generating the search signal, the search signal having frequencies outside a frequency range of an audio signal portion of an external information signal;

a head for recording on the recording medium the audio signal of the external information signal and the search signal generated by said oscillator and for reproducing the audio signal and the search signal; and a further amplifier for outputting to external output means the audio signal reproduced by said head.

8. A search circuit as defined in claim 7, wherein said oscillator generates search signals having frequencies above the frequency range of the audio signal portion of the external information signal.

9. A search circuit, comprising:
a control means for controlling the generation of a search mode enable signal and set operation;
audio signal generating means for generating a search signal according to the search mode enable signal outputted from said control means and for recording and reproducing the search signal on an audio track of a recording medium; and
a search signal detecting means for detecting the search signal outputted from said audio signal generating means,
wherein said search signal detecting means comprises:
a bandpass filter for passing frequency bands having frequencies above frequencies of an audio signal reproduced by a head of said audio signal generating means;
a second amplifier for amplifying an output of said bandpass filter;
a smoothing circuit for converting an output of said second amplifier to direct current;
a comparator for comparing the direct current of said smoothing circuit with a reference voltage; and
a transistor for generating a detection signal in accordance with an output of said comparator.

10. A search circuit for finding a desired location on a recording medium, comprising:
a control circuit that controls the generation of a search mode enable signal for marking the desired location;
an audio signal generating circuit that generates a search signal in accordance with the search mode enable signal and that records the search signal on the recording medium at substantially the desired location and reproduces the search signal from a recording medium; and
a search signal detecting circuit that detects the search signal generated by said audio signal generating circuit,
wherein said search signal detecting circuit comprises:
a bandpass filter for passing frequency bands having frequencies above frequencies of an audio signal reproduced by a head of said audio signal generating means;
an amplifier for amplifying an output of said bandpass filter;
a smoothing circuit for converting an output of said second amplifier to direct current;
a comparator for comparing the direct current of said smoothing circuit with a reference voltage; and
a transistor for generating a detection signal in accordance with an output of said comparator.

11. A search circuit as defined in claim 10, wherein said search signal detecting circuit supplies a detection signal to said control circuit for controlling a recording medium driving mechanism.

12. A search circuit as defined in claim 10, wherein said audio signal generating circuit generates search signals having frequencies outside a frequency range of an audio program signal.

13. A search circuit as defined in claim 12, wherein said audio signal generating circuit generates search signals having frequencies above the frequency range of the audio program signal.

* * * * *